(12) United States Patent
Pang et al.

(10) Patent No.: US 8,306,229 B2
(45) Date of Patent: Nov. 6, 2012

(54) METHOD FOR MANAGING NETWORK KEY AND UPDATING SESSION KEY

(75) Inventors: Liaojun Pang, Shaanxi (CN); Jun Cao, Shaanxi (CN); Haibo Tian, Shaanxi (CN); Zhenhai Huang, Shaanxi (CN); Bianling Zhang, Shaanxi (CN)

(73) Assignee: China Iwncomm Co., Ltd. (CN)

( * ) Notice: Subject to any disclaimer, the term of this patent is extended or adjusted under 35 U.S.C. 154(b) by 693 days.

(21) Appl. No.: 12/442,513

(22) PCT Filed: Jul. 17, 2007

(86) PCT No.: PCT/CN2007/070306
§ 371 (c)(1),
(2), (4) Date: Mar. 23, 2009

(87) PCT Pub. No.: WO2008/034362
PCT Pub. Date: Mar. 27, 2008

(65) Prior Publication Data
US 2009/0300358 A1    Dec. 3, 2009

(30) Foreign Application Priority Data
Sep. 23, 2006    (CN) .......................... 2006 1 0104679

(51) Int. Cl.
*H04L 29/06* (2006.01)
(52) U.S. Cl. ....................................... 380/278; 713/171
(58) Field of Classification Search .................. 380/277, 380/278, 281, 283, 284, 247, 44, 259, 270; 713/168, 171, 163, 175, 176, 181
See application file for complete search history.

(56) References Cited

U.S. PATENT DOCUMENTS

| 2005/0198490 A1 | 9/2005 | Jaganathan et al. |
| 2006/0115085 A1 | 6/2006 | Iwamura |
| 2008/0080713 A1* | 4/2008 | Cho et al. ...................... 380/273 |
| 2009/0019284 A1* | 1/2009 | Cho et al. ...................... 713/170 |

FOREIGN PATENT DOCUMENTS

| CN | 1359574 A | 7/2002 |
| CN | 1668000   | 9/2005 |
| CN | 1780413 A | 5/2006 |

OTHER PUBLICATIONS

Li Huixian "Improvement on WLAN multicast key management protocol" 2008 International Conference on Computational Intelligence and Security, Dec. 13, 2008, pp. 419-424, XP031379269.

(Continued)

*Primary Examiner* — Gilberto Barron, Jr.
*Assistant Examiner* — Izunna Okeke
(74) *Attorney, Agent, or Firm* — Cantor Colburn LLP

(57) ABSTRACT

A method for managing network key and updating session key is provided. The step of the key management includes: constructing key request group, constructing key negotiation response group, and constructing key negotiation acknowledgement group. The step of multicasting key management method includes multicasting main key negotiation protocol and multicasting session key distribution protocol. The multicasting main key negotiation protocol comprises key updating informs group, constructing encryption key negotiation request group, constructing key negotiation response group and constructing key negotiation acknowledgement group. The multicasting session key distribution protocol comprises multicasting session key request and multicasting session key distribution.

9 Claims, 2 Drawing Sheets

OTHER PUBLICATIONS

IEEE Standard for Local and metropolitan area networks, Part 16: Air Interface for Fixed and Mobile Broadband Wireless Access Systems Amendment 2: Physical and Medium Access Control Layers for Combined Fixed and Mobile Operation in Licensed Bands, Jan. 1, 2006, pp. 1-864, XP017603857 (part 1 and 2).

International Search Report PCT/CN2007/070306; Dated Aug. 30, 2007.

* cited by examiner

METHOD FOR MANAGING NETWORK KEY AND UPDATING SESSION KEY

This application claims priority to Chinese Patent Application No. 200610104679.4, entitled "METHOD FOR MANAGING NETWORK KEY AND UPDATING TRAFFIC ENCRYPTION KEY", filed with the Chinese Patent Office on Sep. 23, 2006, content of which is incorporated herein for reference in its entirety.

FIELD OF THE INVENTION

The present invention relates to a method for managing a network key and updating a traffic encryption key. Particularly, the method may be applied in a wired network and a wireless network such as a Wireless Local Area Network (WLAN), a Wireless Metropolitan Area Network (WMAN) and a Broadband Wireless Multimedia (BWM) network.

BACKGROUND OF THE INVENTION

The security issue of the wireless network is far more important than that of the wired Ethernet. The US Institute of Electrical and Electronics Engineers (IEEE) has stipulated 802.11 and 802.16 serial standards to enhance the security of the Wireless Local Area Network and the Wireless Metropolitan Area Network and to provide a secure access to a base station for a mobile station. China has promulgated the national standard of the Wireless Local Area Network GB15629.11, generally called WLAN Authentication and Privacy Infrastructure (WAPI) protocol. The BWM network, as a new wireless network architecture, integrates data communication and broadcast communication. Secure access and secure communication issues should be addressed in the BWM network. One of key issues for addressing the secure communication is how to manage diverse keys in the system.

IEEE802.11 proposes the Wired Equivalent Privacy (WEP) protocol to implement the security of WLAN, in which the key management is very simple, i.e. a shared key is configured manually to use between a mobile station and an access point. Disadvantages lie in that there is no perfect key management solution, which causes difficult system extension and bad system flexibility.

The WEP cryptographic protocol has a severe security fault. The IEEE802.11i standard utilizes four handshake protocols to manage and deduce keys, which addresses the security issue of WEP, but has the following disadvantages: key management can not be based on levels of service, i.e. key deduction is performed between specific terminals and access nodes and different keys can not be deduced for different services to realize differentiated levels of service. The negotiation efficiency of multicast key is low, i.e. a negotiation of a multicast key should be performed between an access node and any one of a group of mobile stations. The update efficiency of multicast key is low, i.e. an update of a multicast key needs the access node and each mobile station to perform the update, which causes a low efficiency. Different multicast encryption keys can not be provided for different services.

Some disadvantages in WEP are overcome in Chinese national standard GB15629.11. However, the key management protocol of GB15629.11 has the same disadvantages as IEEE802.11i.

The WMAN IEEE802.16 criteria proposed by the US IEEE can not prevent an attacker from imitating a base station to cheat a mobile station, thus the key management is not secure. IEEE802.16e standard use the method of IEEE802.11i standard for reference to propose an improved solution. Such a solution has the following disadvantages:

Key management is performed in a time synchronization manner, which causes complicated state management. The use and disuse of a new key are determined on time. It is complicated to maintain synchronization clocks in a distributed system. There are many system states, which causes complicated management.

SUMMARY OF THE INVENTION

The present invention provides a method for network key management and traffic encryption key update, which can solve the technical problems of the low efficiency of negotiation and update of multicast keys and complicated system state management in the prior art.

Technical solutions of the present invention are described as follows.

A method for unicast key management in a network includes:

constructing a key negotiation request packet and sending the key negotiation request packet to a base station, by a mobile station;

constructing a key negotiation response packet on receiving the key negotiation request packet and sending the key negotiation response packet to the mobile station, by the base station; and on receiving the key negotiation response packet, decrypting the key negotiation response packet with a key encryption key deduced from an authority key corresponding to an Authority Key Identifier AKID to obtain a Traffic Encryption Key Material TEKM, deducing a session encryption key and an integrity check key by utilizing random numbers selected by the base station and the mobile station, and constructing a key negotiation acknowledgement packet, by the mobile station.

Preferably, in case of an initial key negotiation, or if the mobile station requests for key update or receives a key update notification packet from the base station, the mobile station sends the key negotiation request packet to the base station, so as to activate a key negotiation procedure.

Preferably, the method for unicast key management in a network further includes: if the base station sends the key update notification packet before receiving the key negotiation request packet, the base station checks whether values of corresponding fields of the key update notification packet and the key negotiation request packet are the same as each other; if yes, the base station constructs the key negotiation response packet; otherwise, the base station discards the key negotiation request packet with no processing.

The key update notification packet includes: an Identity of the base station $ID_{BS}$, a Security Association Identifier SAID, an Authority Key Identifier AKID, a Traffic Encryption Key Identifier TEKID, and a Message Integrity Code MIC; where the Traffic Encryption Key Identifier TEKID is adapted to identify a traffic encryption key to be updated, and a value of the Message Integrity Code MIC is calculated from an integrity check key deduced from an authority key AK corresponding to the AKID.

The key negotiation request packet includes: an identity of the mobile station $ID_{MS}$, a Security Association Identifier SAID, an Authority Key Identifier AKID, a Traffic Encryption Key Identifier TEKID, a random number selected by the mobile station $N_{MS}$, and a Message Integrity Code MIC; wherein the Traffic Encryption Key Identifier TEKID is adapted to identify a traffic encryption key to be updated, and a value of the Message Integrity Code MIC is calculated from an integrity check key deduced from an authority key AK corresponding to the AKID.

The key negotiation response packet includes: the Identity of the mobile station $ID_{MS}$, the Identity of the base station $ID_{BS}$, a Security Association Identifier SAID, the Authority Key Identifier AKID, a Traffic Encryption Key Identifier TEKID, a random number selected by the mobile station $N_{MS}$, a random number selected by the base station $N_{BS}$, a cipher text $E_{KEK}(TEKM)$ of a Traffic Encryption Key Material TEKM which is selected by the base station and encrypted with a key encryption key deduced from an authority key corresponding to the Authority Key Identifier AKID, a period of validity of the Traffic Encryption Key Material TEKM $Life_{TEK}$, and a Message Integrity Code MIC; wherein a value of the random number selected by the mobile station $N_{MS}$ is the same as that of a corresponding field in the key negotiation request packet, and a value of Message Integrity Code MIC is calculated from an integrity check key deduced from the TEKM, $N_{MS}$ and $N_{BS}$.

The key negotiation acknowledgement packet includes: the Identity of the base station $ID_{BS}$, the Identity of the mobile station $ID_{MS}$, a Security Association Identifier SAID, the Authority Key Identifier AKID, a Traffic Encryption Key Identifier TEKID, a random number selected by the base station $N_{BS}$, and a Message Integrity Code MIC; wherein a value of the random number selected by the base station $N_{BS}$ is the same as that of a corresponding field in the key negotiation response packet, and a value of Message Integrity Code MIC is calculated from an integrity check key deduced from the TEKM, $N_{MS}$ and $N_{BS}$.

A method for multicast key management includes:

constructing a key negotiation request packet and sending the key negotiation request packet to a base station, by a mobile station;

constructing a key negotiation response packet on receiving the key negotiation request packet and sending the key negotiation response packet to the mobile station, by the base station;

on receiving the key negotiation response packet, decrypting the key negotiation response packet with a key encryption key deduced from an authority key corresponding to an Authority Key Identifier AKID to obtain a Traffic Encryption Key Material TEKM, constructing a key negotiation acknowledgement packet and sending the key negotiation acknowledgement packet to the base station, by the mobile station; and deducing a Group Key Encryption Key GKEK and a Group Message Integrity Key GMIK, by the mobile station;

sending by the mobile station a multicast traffic encryption key request packet to the base station if the mobile station needs to negotiate or update a multicast traffic encryption key;

on receiving the multicast traffic encryption key request packet from the mobile station, sending by the base station a multicast traffic encryption key distribution packet to the mobile station; or, if the base station needs to update a multicast key, broadcasting by the base station a multicast traffic encryption key distribution packet to all mobile stations.

Preferably, the method for multicast key management further includes: in case that the base station needs to update a traffic encryption key but the mobile station does not initiate a traffic encryption key update request, sending by the base station the key update notification packet to the mobile station, to inform the mobile station to update the traffic encryption key.

Preferably, in case of an initial key negotiation, or if the mobile station receives a key update notification packet from the base station, the mobile station sends the key negotiation request packet to the base station, so as to activate a key negotiation procedure.

Preferably, the method for multicast key management further includes: if the base station sends the key update notification packet before receiving the key negotiation request packet, checking by the base station whether values of corresponding fields of the key update notification packet and the key negotiation request packet are the same as each other; if yes, constructing by the base station the key negotiation response packet; otherwise, discarding by the base station the key negotiation request packet with no processing.

The key update notification packet includes: an Identity of the base station $ID_{BS}$, a Security Association Identifier SAID, the Authority Key Identifier AKID, a Traffic Encryption Key Identifier TEKID, and a Message Integrity Code MIC; wherein the Traffic Encryption Key Identifier TEKID is adapted to identify a traffic encryption key to be updated, and a value of the Message Integrity Code MIC is calculated from an integrity check key deduced from an authority key corresponding to the AKID.

The key negotiation request packet includes: an Identity of the mobile station $ID_{MS}$, a Security Association Identifier SAID, an Authority Key Identifier AKID, a Traffic Encryption Key Identifier TEKID, a random number selected by the mobile station $N_{MS}$, and a Message Integrity Code MIC; wherein the Traffic Encryption Key Identifier TEKID is adapted to identify a traffic encryption key to be updated, and a value of the Message Integrity Code MIC is calculated from an integrity check key deduced from an authority key AK corresponding to the AKID.

The key negotiation response packet includes: the Identity of the mobile station $ID_{MS}$, the Identity of the base station $ID_{BS}$, a Security Association Identifier SAID, the Authority Key Identifier AKID, a Traffic Encryption Key Identifier TEKID, a random number selected by the mobile station $N_{MS}$, a random number selected by the base station $N_{BS}$, a cipher text $E_{KEK}(TEKM)$ of a Traffic Encryption Key Material TEKM which is selected by the base station and encrypted with a key encryption key deduced from an authority key corresponding to the Authority Key Identifier AKID, a period of validity of the traffic encryption key $Life_{TEK}$, and a Message Integrity Code MIC; wherein a value of the random number selected by the mobile station $N_{MS}$ is the same as that of a corresponding field in the key negotiation request packet, and a value of Message Integrity Code MIC is calculated from an integrity check key deduced from the TEKM, $N_{MS}$ and $N_{BS}$.

The key negotiation acknowledgement packet includes: the Identity of the base station $ID_{BS}$, the Identity of the mobile station $ID_{MS}$, a Security Association Identifier SAID, the Authority Key Identifier AKID, a Traffic Encryption Key Identifier TEKID, a random number selected by the base station $N_{BS}$, and a Message Integrity Code MIC; wherein a value of the random number selected by the base station $N_{BS}$ is the same as that of a corresponding field in the key negotiation response packet, and a value of Message Integrity Code MIC is calculated from an integrity check key deduced from the TEKM, $N_{MS}$ and $N_{BS}$.

The multicast traffic encryption key request packet includes: a Security Association Identifier SAID, a Traffic Encryption Key Identifier TEKID, a Group Traffic Encryption Key Identifier GTEKID, a random number selected by the mobile station $N_{MS}$, and a Message Integrity Code MIC; wherein the Group Traffic Encryption Key Identifier GTEKID is adapted to identify a multicast traffic encryption key to be negotiated or requested, and a value of the Message Integrity Code MIC is calculated from a Multicast Message Integrity Key GMIK deduced from the TEKM corresponding to the TEKID.

The multicast traffic encryption key distribution packet includes: a Security Association Identifier SAID, a Traffic Encryption Key Identifier TEKID, a Group Traffic Encryption Key Identifier GTEKID, a random number selected by the mobile station $N_{MS}$, a cipher text $E_{KEK}$(GTEKM) of a Group Traffic Encryption Key Material GTEKM which is selected by the base station and encrypted with a Group Key Encryption Key GKEK deduced from the TEKM corresponding to the TEKID, a period of validity of a group traffic encryption key $Life_{GTEK}$, and a Message Integrity Code MIC; wherein the random number selected by the mobile station $N_{MS}$ is the same as that of the multicast traffic encryption key request packet; however, if the key update procedure is initiated by the base station, the random number is determined by the base station, and a value of the Message Integrity Code MIC is calculated from the Group Message Integrity Key GMIK deduced from the TEKM corresponding to the TEKID.

The present invention can provide different levels of traffic encryption keys for different services. In other words, different services correspond to different encryption keys. The multicast traffic encryption key negotiation utilizes the broadcast channel rationally, improving the performance. The base station does not need to negotiate the multicast traffic encryption key with each mobile station respectively. In addition, the key negotiation protocol and the multicast traffic encryption key distribution protocol are utilized in the present invention to realize efficient update of the multicast traffic encryption key, which makes the update of the multicast traffic encryption key more flexible. The key enablement mechanism utilizes a message acknowledgement manner, thereby avoiding the disadvantages of maintenance of multiple time synchronization and states, which simplifies the state management.

DETAILED DESCRIPTION OF THE INVENTION

The technical solutions according to embodiments of the present invention are described clearly and completely as below with reference to the drawings of the embodiments of the present invention. Apparently, the embodiments as described are merely a part of embodiments of the present invention, but not all embodiments of the present invention. All other embodiments that can be made based on the above embodiments by those skilled in the art without creative activity shall fall into the scope of the present invention.

Figure 1:
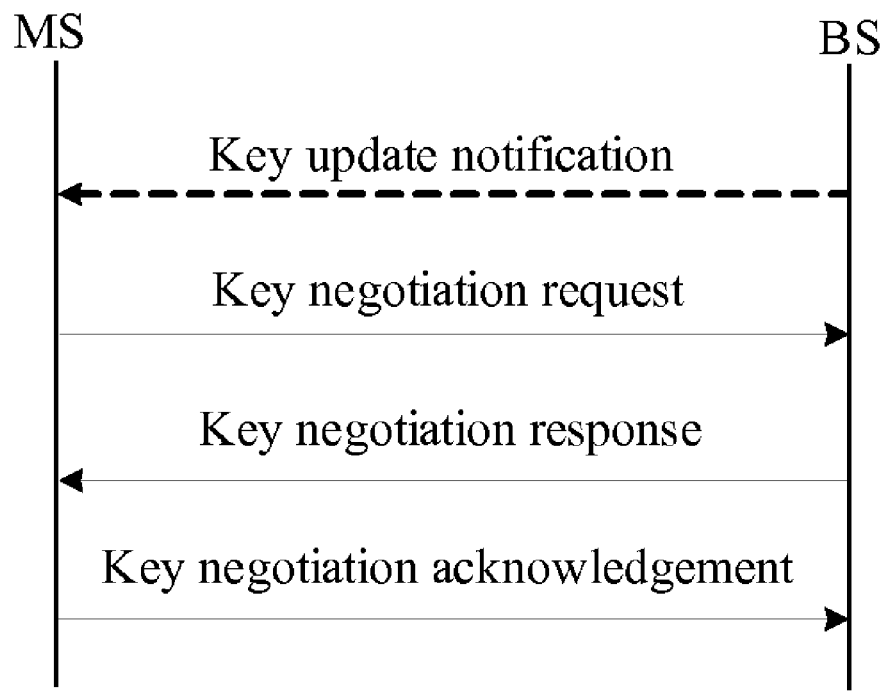
FIG. 1 is a diagram of a method for unicast key management in a network according to the present invention.

Referring to FIG. 1, a method for unicast key management in a network according to the present invention includes the steps as follows.

110. Construct a key negotiation request packet

In case of an initial key negotiation, or if a mobile station requests for key update or receives a key update notification packet from a base station, the mobile station sends the key negotiation request packet to the base station, so as to activate a key negotiation procedure.

The key update notification packet includes: an Identity of the Base Station (BS) $ID_{BS}$, a Security Association Identifier SAID, an Authority Key Identifier AKID, a Traffic Encryption Key Identifier TEKID, and a Message Integrity Code MIC. The Traffic Encryption Key Identifier TEKID is adapted to identify a traffic encryption key to be updated, and a value of the Message Integrity Code MIC is calculated from an integrity check key deduced from an authority key AK corresponding to the AKID. The Security Association Identifier SAID corresponds to a particular service. The ID of the SAID can differentiate a unicast SA from a multicast SA.

The key negotiation request packet includes: an Identity of the Mobile Station (MS) $ID_{MS}$, a Security Association Identifier SAID, an Authority Key Identifier AKID, a Traffic Encryption Key Identifier TEKID, a random number selected by the mobile station $N_{MS}$, and a Message Integrity Code MIC. The Traffic Encryption Key Identifier TEKID is adapted to identify a traffic encryption key to be updated, and a value of the Message Integrity Code MIC is calculated from an integrity check key deduced from an authority key AK corresponding to the AKID.

120. Construct a key negotiation response packet (2.1) The base station constructs the key negotiation response packet on receiving the key negotiation request packet from the mobile station.

The key negotiation response packet includes: the Identity of the mobile station $ID_{MS}$, the Identity of the base station $ID_{BS}$, a Security Association Identifier SAID, the Authority Key Identifier AKID, a Traffic Encryption Key Identifier TEKID, a random number selected by the mobile station $N_{MS}$, a random number selected by the base station $N_{BS}$, a cipher text $E_{KEK}$(TEKM) of a Traffic Encryption Key Material TEKM which is selected by the base station and encrypted with a key encryption key deduced from an authority key corresponding to the Authority Key Identifier AKID, a period of validity of the Traffic Encryption Key Material TEKM $Life_{TEK}$, and a Message Integrity Code MIC. A value of the random number selected by the mobile station $N_{MS}$ should be the same as that of a corresponding field in the key negotiation request packet, and a value of the Message Integrity Code MIC is calculated from an integrity check key deduced from the TEKM, $N_{MS}$ and $N_{BS}$.

(2.2) If the base station sends the key update notification packet before receiving the key negotiation request packet, the base station checks whether values of corresponding fields of the key update notification packet and the key negotiation request packet are the same as each other; if yes, the base station constructs the key negotiation response packet; otherwise, the base station discards the key negotiation request packet with no processing.

(2.3) The base station sends the key negotiation response packet to the mobile station, and deduces a unicast session encryption key and an integrity check key.

130. Construct a key negotiation acknowledgement packet

The mobile station, on receiving the key negotiation response packet from the base station, decrypts the key negotiation response packet with a key encryption key deduced from an authority key corresponding to the Authority Key Identifier AKID to obtain the Traffic Encryption Key Material TEKM, and constructs the key negotiation acknowledgement packet.

The key negotiation acknowledgement packet includes: the Identity of the base station $ID_{BS}$, the Identity of the mobile station $ID_{MS}$, a Security Association Identifier SAID, the Authority Key Identifier AKID, a Traffic Encryption Key Identifier TEKID, a random number selected by the base station $N_{BS}$, and a Message Integrity Code MIC. A value of the random number selected by the base station $N_{BS}$ should be the same as that of a corresponding field in the key negotiation response packet, and a value of the Message Integrity Code MIC is calculated from an integrity check key deduced from the TEKM, $N_{MS}$ and $N_{BS}$.

Figure 2:
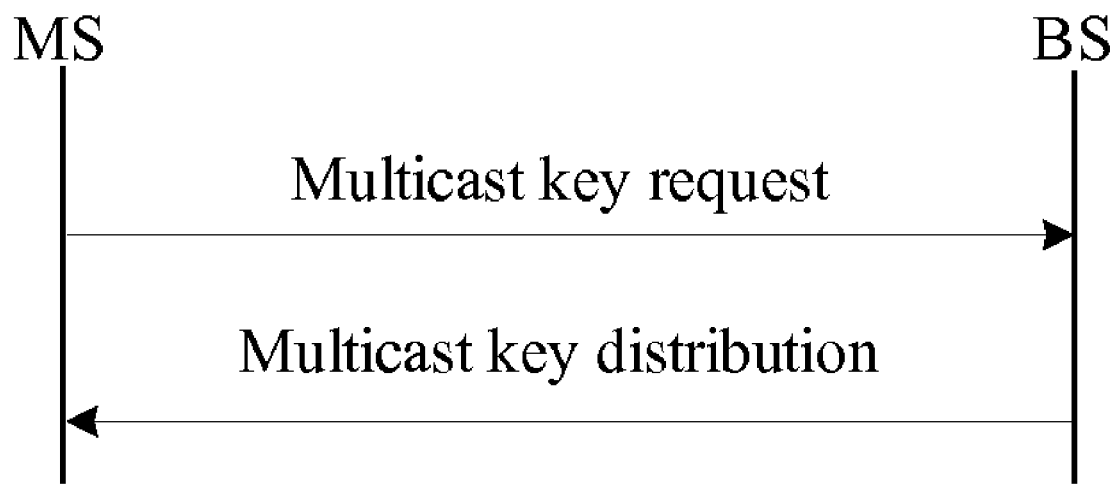
FIG. 2 is a diagram of a method for multicast traffic encryption key management according to the present invention.

Referring to FIG. 2, a method for multicast key management according to the present invention includes the steps as follows.

210. A Multicast Master Key Negotiation Protocol (1.1) Construct a key Update Notification Packet In case that a base station needs to update a traffic encryption key but a mobile station does not initiate a traffic encryption key update request, the base station sends the key update notification packet to the mobile station, to inform the mobile station to update the traffic encryption key. The key update notification packet is used for only updating the traffic encryption key, not for an initial key negotiation.

The traffic encryption key update notification packet includes: an Identity of the base station $ID_{BS}$, a Security Association Identifier SAID, the Authority Key Identifier AKID, a Traffic Encryption Key Identifier TEKID, and a Message Integrity Code MIC. The Traffic Encryption Key Identifier is adapted to identify a traffic encryption key to be updated, and a value of Message Integrity Code MIC is calculated from an integrity check key deduced from an authority key corresponding to the AKID.

(1.2) Construct a Key Negotiation Request Packet

In case of an initial key negotiation, or if the mobile station receives the key update notification packet from the base station, the mobile station sends the key negotiation request packet to the base station, so as to activate a key negotiation procedure.

The key negotiation request packet includes: an Identity of the mobile station $ID_{MS}$, a Security Association Identifier SAID, an Authority Key Identifier AKID, a Traffic Encryption Key Identifier TEKID, a random number selected by the mobile station $N_{MS}$, and a Message Integrity Code MIC. The Traffic Encryption Key Identifier TEKID is adapted to identify the traffic encryption key to be updated, and a value of the Message Integrity Code MIC is calculated from an integrity check key deduced from an authority key AK corresponding to the AKID.

(1.3) Construct a Key Negotiation Response Packet (1.3.1) The base station constructs the key negotiation response packet on receiving the key negotiation request packet from the mobile station.

The key negotiation response packet includes: the Identity of the mobile station $ID_{MS}$, the Identity of the base station $ID_{BS}$, a Security Association Identifier SAID, the Authority Key Identifier AKID, a Traffic Encryption Key Identifier TEKID, a random number selected by the mobile station $N_{MS}$, a random number selected by the base station $N_{BS}$, a cipher text $E_{KEK}(TEKM)$ of a Traffic Encryption Key Material TEKM which is selected by the base station and encrypted with a key encryption key deduced from an authority key corresponding to the Authority Key Identifier AKID, a period of validity of the traffic encryption key $Life_{TEK}$, and a Message Integrity Code MIC. A value of the random number selected by the mobile station $N_{MS}$ should be the same as that of a corresponding field in the key negotiation request packet, and a value of the Message Integrity Code MIC is calculated from an integrity check key deduced from the TEKM, $N_{MS}$ and $N_{BS}$.

(1.3.2) If the base station sends the key update notification packet before receiving the key negotiation request packet, the base station checks whether values of corresponding fields of the key update notification packet and the key negotiation request packet are the same as each other; if yes, the base station constructs the key negotiation response packet; otherwise, the base station discards the key negotiation request packet with no processing.

(1.3.3) The base station sends the key negotiation response packet to the mobile station, and deduces a Group Key Encryption Key GKEK and a Group Message Integrity Key GMIK.

(1.4) Construct a key negotiation acknowledgement packet

The mobile station, on receiving the key negotiation response packet from the base station, decrypts the key negotiation response packet with a key encryption key deduced from an authority key corresponding to the Authority Key Identifier AKID to obtain a Traffic Encryption Key Material plain text TEKM, and constructs the key negotiation acknowledgement packet. The mobile station sends the key negotiation acknowledgement packet to the base station, to deduce the Group Key Encryption Key GKEK and the Multicast Message Integrity Key GMIK.

The key negotiation acknowledgement packet includes: the Identity of the base station $ID_{BS}$, the Identity of the mobile station $ID_{MS}$, a Security Association Identifier SAID, the Authority Key Identifier AKID, a Traffic Encryption Key Identifier TEKID, a random number selected by the base station $N_{BS}$, and a Message Integrity Code MIC. A value of the random number selected by the base station $N_{BS}$ should be the same as that of a corresponding field in the key negotiation response packet, and a value of the Message Integrity Code MIC is calculated from an integrity check key deduced from the TEKM, $N_{MS}$ and $N_{BS}$.

220. A multicast traffic encryption key distribution protocol (2.1) Multicast traffic encryption key request The mobile station sends a multicast traffic encryption key request packet to the base station if the mobile station needs to negotiate or update a multicast traffic encryption key.

The multicast traffic encryption key request packet includes: a Security Association Identifier SAID, a Traffic Encryption Key Identifier TEKID, a Group Traffic Encryption Key Identifier GTEKID, a random number selected by the mobile station $N_{MS}$, and a Message Integrity Code MIC. The Group Traffic Encryption Key Identifier GTEKID is adapted to identify the multicast traffic encryption key to be negotiated or requested, and a value of the Message Integrity Code MIC is calculated from the Group Message Integrity Key GMIK deduced from the TEKM corresponding to the TEKID.

(2.2) Multicast traffic encryption key distribution

The base station, on receiving the multicast traffic encryption key request packet from the mobile station, sends a multicast traffic encryption key distribution packet to the mobile station; or, if the base station needs to update a multicast key, the base station broadcasts a multicast traffic encryption key distribution packet to all mobile stations.

The multicast traffic encryption key distribution packet includes: a Security Association Identifier SAID, a Traffic Encryption Key Identifier TEKID, a Group Traffic Encryption Key Identifier GTEKID, a random number selected by the mobile station $N_{MS}$, a cipher text $E_{KEK}(GTEKM)$ of a Group Traffic Encryption Key Material GTEKM which is selected by the base station and encrypted with a Group Key Encryption Key GKEK deduced from the TEKM corresponding to the TEKID, a period of validity of the group traffic encryption key $Life_{GTEK}$, and a Message Integrity Code MIC. The random number selected by the mobile station $N_{MS}$ should be the same as that of the multicast traffic encryption key request. However, if the key update procedure is initiated by the base station, the random number may be determined by the base station, and a value of the Message Integrity Code MIC is calculated from the Group Message Integrity Key GMIK deduced from the TEKM corresponding to the TEKID.

The present invention has the following advantages:

The present invention can provide different levels of traffic encryption keys for different services. In other words, different services correspond to different encryption keys.

The multicast traffic encryption key negotiation utilizes the broadcast channel rationally, improving the performance. The base station does not need to negotiate the multicast traffic encryption key with each mobile station respectively.

The key negotiation protocol and the multicast traffic encryption key distribution protocol are utilized to realize efficient update of the multicast traffic encryption key, which makes the update of the multicast traffic encryption key more flexible.

The key enablement mechanism utilizes a message acknowledgement manner, thereby avoiding the disadvantages of maintenance of multiple time synchronization and states, which simplifies the state management.

The above embodiments are described for illustrating the principle of the present invention. It can be understood that detailed embodiments of the present invention are not limited to these ones. Various variations and modifications made by those skilled in the art within the scope of the present invention shall fall into the scope of the scope of the present invention as defined in the attached claims.

The invention claimed is:

1. A method for unicast key management in a network, comprising:
   constructing a key negotiation request packet and sending the key negotiation request packet to a base station, by a mobile station, wherein the key negotiation request packet comprises an Authority Key Identifier AKID, a random number selected by the mobile station $N_{MS}$, and a Message Integrity Code MIC, and wherein a value of the Message Integrity Code MIC is calculated from an integrity check key deduced from an authority key AK corresponding to the AKID;
   constructing a key negotiation response packet on receiving the key negotiation request packet and sending the key negotiation response packet to the mobile station, by the base station, wherein the key negotiation response packet comprises: the random number $N_{MS}$ selected by the mobile station, a random number $N_{BS}$ selected by the base station, a cipher text $E_{EK}(TEKM)$ of a Traffic Encryption Key Material TEKM which is selected by the base station and encrypted with a key encryption key deduced from the authority key AK corresponding to the Authority Key Identifier AKID, and a Message Integrity Code MIC having a value calculated from an integrity check key deduced from the TEKM, $N_{MS}$ and $N_{BS}$; and
   on receiving the key negotiation response packet, decrypting the key negotiation response packet with the key encryption key deduced from the authority key corresponding to the Authority Key Identifier AKID to obtain the Traffic Encryption Key Material TEKM, deducing a session encryption key and an integrity check key by utilizing the random numbers selected by the base station and the mobile station, and constructing a key negotiation acknowledgement packet, by the mobile station.

2. The method for unicast key management in a network according to claim 1, wherein in case of an initial key negotiation, or if the mobile station requests for key update or receives a key update notification packet from the base station, the mobile station sends the key negotiation request packet to the base station, so as to activate a key negotiation procedure.

3. The method for unicast key management in a network according to claim 1, further comprising:
   if the base station sends a key update notification packet before receiving the key negotiation request packet, the base station checks whether values of corresponding fields of the key update notification packet and the key negotiation request packet are the same as each other; if yes, the base station constructs the key negotiation response packet; otherwise, the base station discards the key negotiation request packet with no processing.

4. The method for unicast key management in a network according to claim 1, wherein
   the key update notification packet comprises: an Identity of the base station $ID_{BS}$, a Security Association Identifier SAID, an Authority Key Identifier AKID, a Traffic Encryption Key Identifier TEKID, and a Message Integrity Code MIC; wherein the Traffic Encryption Key Identifier TEKID is adapted to identify a traffic encryption key to be updated, and a value of the Message Integrity Code MIC is calculated from an integrity check key deduced from an authority key AK corresponding to the AKID;
   the key negotiation request packet further comprises: an identity of the mobile station $ID_{MS}$, a Security Association Identifier SAID, and a Traffic Encryption Key Identifier TEKID; wherein the Traffic Encryption Key Identifier TEKID is adapted to identify a traffic encryption key to be updated;
   the key negotiation response packet further comprises: the Identity of the mobile station $ID_{MS}$, an Identity of the base station $ID_{BS}$, a Security Association Identifier SAID, the Authority Key Identifier AKID, the Traffic Encryption Key Identifier TEKID, and a period of validity of the Traffic Encryption Key Material TEKM $Life_{TEK}$;
   the key negotiation acknowledgement packet comprises: the Identity of the base station $ID_{BS}$, the Identity of the mobile station $ID_{MS}$, the Security Association Identifier SAID, the Authority Key Identifier AKID, the Traffic Encryption Key Identifier TEKID, the random number selected by the base station $N_{BS}$, and a Message Integrity Code MIC; wherein a value of Message Integrity Code MIC is calculated from an integrity check key deduced from the TEKM, $N_{MS}$ and $N_{BS}$.

5. A method for multicast key management, comprising:
   constructing a key negotiation request packet and sending the key negotiation request packet to a base station, by a mobile station, wherein the key negotiation request packet comprises an Authority Key Identifier AKID, a random number selected by the mobile station $N_{MS}$, and a Message Integrity Code MIC, and wherein a value of the Message Integrity Code MIC is calculated from an integrity check key deduced from an authority key AK corresponding to the AKID;
   constructing a key negotiation response packet on receiving the key negotiation request packet and sending the key negotiation response packet to the mobile station, by the base station, wherein the key negotiation response packet comprises: the random number $N_{MS}$ selected by the mobile station, a random number $N_{BS}$ selected by the base station, a cipher text $E_{KEK}(TEKM)$ of a Traffic Encryption Key Material TEKM which is selected by the base station and encrypted with a key encryption key deduced from the authority key AK corresponding to the Authority Key Identifier AKID, and a Message Integrity Code MIC having a value calculated from an integrity check key deduced from the TEKM, $N_{MS}$ and $N_{BS}$;

on receiving the key negotiation response packet, decrypting the key negotiation response packet with the key encryption key deduced from the authority key corresponding to the Authority Key Identifier AKID to obtain the Traffic Encryption Key Material TEKM, constructing a key negotiation acknowledgement packet and sending the key negotiation acknowledgement packet to the base station, by the mobile station; and deducing a Group Key Encryption Key GKEK and a Group Message Integrity Key GMIK, by the mobile station;

sending by the mobile station a multicast traffic encryption key request packet to the base station if the mobile station needs to negotiate or update a multicast traffic encryption key, wherein the multicast traffic encryption key request packet comprises: a Traffic Encryption Key Identifier TEKID, a Group Traffic Encryption Key Identifier GTEKID, a second random number selected by the mobile station $N_{MS}$, and a Message Integrity Code MIC having a value calculated from a Group Message Integrity Key GMIK deduced from the TEKM corresponding to the TEKID;

on receiving the multicast traffic encryption key request packet from the mobile station, sending by the base station a multicast traffic encryption key distribution packet to the mobile station; or, if the base station needs to update a multicast key, broadcasting by the base station a multicast traffic encryption key distribution packet to all mobile stations, wherein the multicast traffic encryption key distribution packet comprises: the Traffic Encryption Key Identifier TEKID, the Group Traffic Encryption Key Identifier GTEKID, the random number selected by the mobile station $N_{MS}$, a cipher text $E_{KEK}$(GTEKM) of a Group Traffic Encryption Key Material GTEKM which is selected by the base station and encrypted with the Group Key Encryption Key GKEK deduced from the TEKM corresponding to the TEKID, and a Message Integrity Code MIC; wherein the random number selected by the mobile station NMS is the same as that of the multicast traffic encryption key request packet; however, if the key update procedure is initiated by the base station, the random number is determined by the base station, and a value of the Message Integrity Code MIC is calculated from the Group Message Integrity Key GMIK deduced from the TEKM corresponding to the TEKID.

6. The method for multicast key management according to claim 5, further comprising:

in case that the base station needs to update a traffic encryption key but the mobile station does not initiate a traffic encryption key update request, sending by the base station the key update notification packet to the mobile station, to inform the mobile station to update the traffic encryption key.

7. The method for multicast key management according to claim 6, wherein in case of an initial key negotiation, or if the mobile station receives a key update notification packet from the base station, the mobile station sends the key negotiation request packet to the base station, so as to activate a key negotiation procedure.

8. The method for multicast key management according to claim 5, further comprising: if the base station sends the key update notification packet before receiving the key negotiation request packet, checking by the base station whether values of corresponding fields of the key update notification packet and the key negotiation request packet are the same as each other; if yes, constructing by the base station the key negotiation response packet; otherwise, discarding by the base station the key negotiation request packet with no processing.

9. The method for multicast key management according to claim 5, wherein the key update notification packet comprises: an Identity of the base station $ID_{BS}$, a Security Association Identifier SAID, the Authority Key Identifier AKID, a Traffic Encryption Key Identifier TEKID, and a Message Integrity Code MIC; wherein the Traffic Encryption Key Identifier TEKID is adapted to identify a traffic encryption key to be updated, and a value of the Message Integrity Code MIC is calculated from an integrity check key deduced from an authority key corresponding to the AKID;

the key negotiation request packet further comprises: an Identity of the mobile station $ID_{MS}$, a Security Association Identifier SAID, and a Traffic Encryption Key Identifier TEKID; wherein the Traffic Encryption Key Identifier TEKID is adapted to identify a traffic encryption key to be updated;

the key negotiation response packet further comprises: the Identity of the mobile station $ID_{MS}$, an Identity of the base station $ID_{BS}$, a Security Association Identifier SAID, the Authority Key Identifier AKID, the Traffic Encryption Key Identifier TEKID, the key negotiation acknowledgement packet comprises: the Identity of the base station $ID_{BS}$, the Identity of the mobile station $ID_{MS}$, a Security Association Identifier SAID, the Authority Key Identifier AKID, the Traffic Encryption Key Identifier TEKID, a random number selected by the base station $N_{BS}$, and a Message Integrity Code MIC; wherein a value of the random number selected by the base station $N_{BS}$ is the same as that of a corresponding field in the key negotiation response packet, and a value of Message Integrity Code MIC is calculated from an integrity check key deduced from the TEKM, $N_{MS}$ and $N_{BS}$;

the multicast traffic encryption key request packet further comprises: a Security Association Identifier SAID;

the multicast traffic encryption key distribution packet further comprises: a Security Association Identifier SAID, and a period of validity of a group traffic encryption key LifeGTEK.

* * * * *